(12) United States Patent
Eisenmenger

(10) Patent No.: US 6,640,453 B2
(45) Date of Patent: Nov. 4, 2003

(54) CLINOMETER

(76) Inventor: Gary Wayne Eisenmenger, 4503 Fox Run Rd., Louisville, KY (US) 40207

( * ) Notice: Subject to any disclaimer, the term of this patent is extended or adjusted under 35 U.S.C. 154(b) by 0 days.

(21) Appl. No.: 10/078,011

(22) Filed: Feb. 19, 2002

(65) Prior Publication Data

US 2003/0154610 A1 Aug. 21, 2003

(51) Int. Cl.⁷ .............................................. G01C 15/10
(52) U.S. Cl. ............................. 33/283; 33/281; 33/392
(58) Field of Search ........................ 33/283, 227, 275 R, 33/281, 282, 290, 365, 369, 391, 392, 1 LE, 398, 399; D10/64, 65, 66

(56) References Cited

U.S. PATENT DOCUMENTS

| | | | | | |
|---|---|---|---|---|---|
| 661,483 | A | * | 11/1900 | Barrie | 33/27.03 |
| 1,398,853 | A | * | 11/1921 | Ginzbourg | 33/283 |
| 1,785,284 | A | * | 12/1930 | Rhodes | 356/148 |
| 2,128,863 | A | * | 8/1938 | Turrian | 33/283 |
| 2,567,653 | A | * | 9/1951 | Ruhland | 33/391 |
| 2,586,074 | A | * | 2/1952 | Memluck | 33/1 LE |
| 2,645,858 | A | * | 7/1953 | Davis | 33/368 |
| 2,685,739 | A | * | 8/1954 | Cole | 33/1 R |
| 2,693,642 | A | * | 11/1954 | Lacefield | 33/281 |
| 2,872,733 | A | * | 2/1959 | Chew | 33/1 LE |
| 3,061,931 | A | * | 11/1962 | Stefano | 33/1 R |
| 3,066,416 | A | * | 12/1962 | Gutting | 33/1 F |
| 4,669,195 | A | * | 6/1987 | Griffin | 33/339 |

* cited by examiner

Primary Examiner—Diego Gutierrez
Assistant Examiner—R. Alexander Smith

(57) ABSTRACT

The current invention discloses an improved clinometer which can be used as an inexpensive form of builder's level or transit due to its capability of orienting itself to a predetermined vertical angle, and maintaining said angle through the use of gravity.

4 Claims, 3 Drawing Sheets

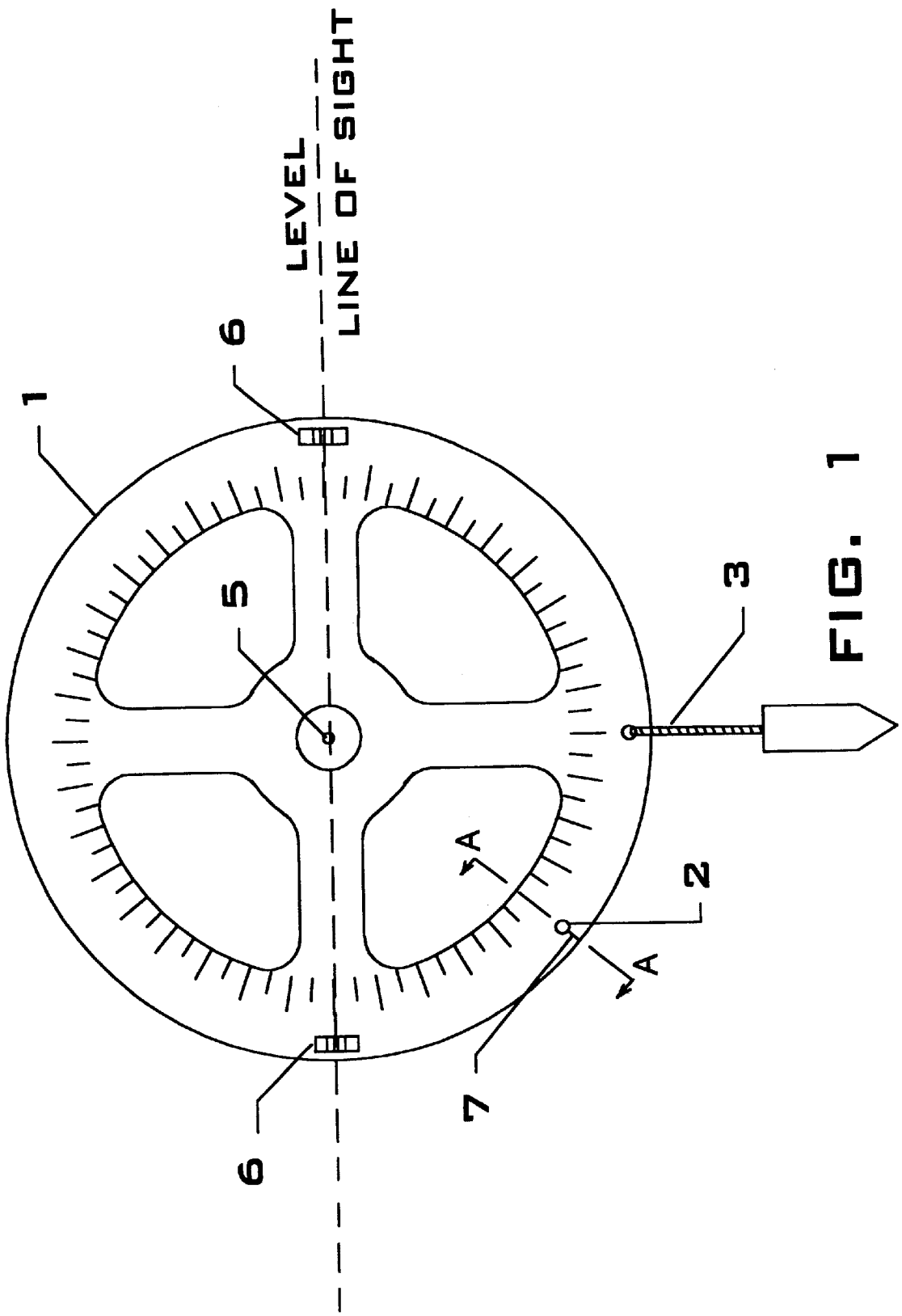

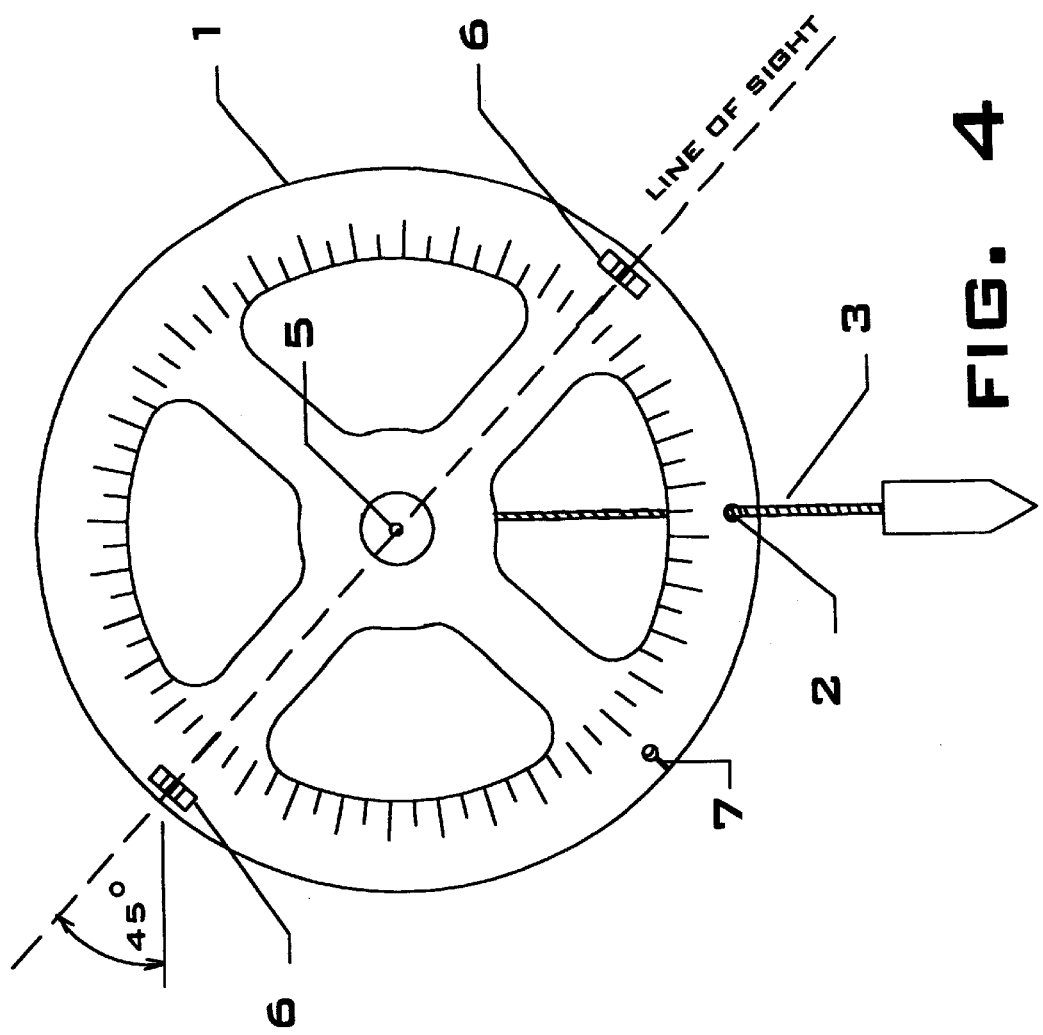

CLINOMETER

BACKGROUND OF THE INVENTION

A clinometer is an old tool used for determining angles in a vertical plane. Various types are available in stores across the country. There are types used to sight objects at a distance, and there are types that can be attached to objects to indicate their inclination to horizontal, such as plumbing pipes during installation. The current invention relates to the type used to sight objects at a distance.

The current state of the art of such devices is that they are basically protractors having visual sights and a plumb-line attached. The user sights the desired object in the distance while another person, a "reader", sees where the plumb-line is in relation to the graduations on the protractor and reads the angle of inclination. This is a functional device that works very well except for two disadvantages; (1) it requires the use of two people, and (2) the device must be held exactly in the desired position by hand, thus requiring a great deal of skill and concentration on the part of the user. A person working alone and wanting to sight a predetermined angle of 45 degrees in a vertical plane to determine the height of an object, such as a tree for instance, would have great difficulty in doing so with such a device.

The current invention offers an improved type of clinometer capable of being set to a predetermined angle of sight before use. The user then holds the device in his/her hand, only one hand required, whereupon the device will automatically seek the predetermined angle and maintain its setting at said angle. This feature of seeking a predetermined angle and holding the setting is not seen on any such instrument in the prior art. Devices of the prior art are designed to allow only for the measurement of angles sighted, not for the ability to sight a predetermined angle as is possible with the current invention. While the sighting of predetermined angles in a vertical plane has been possible for many years with the aid of a complicated and expensive instrument such as an optical transit, the object of the current invention is to provide a very simple and inexpensive device that will allow the user to accomplish the same basic task, though admittedly with less accuracy than is possible with an optical transit.

BRIEF SUMMARY OF THE INVENTION

The current invention is essentially a clinometer which has been improved to allow the user to not only take a sighting and then determine the angle of inclination, but to predetermine a desired angle of inclination to be sighted.

The disclosed embodiment of the current invention is capable of functioning as a self-leveling builder's level or as a transit capable of orienting itself to a predetermined angle of 45° in a vertical plane. One application would be to measure the height of objects using the rule of the right triangle. Due to the force of gravity the device disclosed herein will automatically give the user a visual sighting of the exact predetermined angle in a vertical plane when combined with the use of a plumb-line

BRIEF DESCRIPTION OF THE DRAWINGS

FIG. 1 depicts the device as it would appear in use with a plumb-line to sight a level line.

FIG. 4 depicts the device as it would appear in use with a plumb-line to sight a 45 degree angle in a vertical plane.

DETAILED DESCRIPTION OF THE INVENTION

Figure 2:
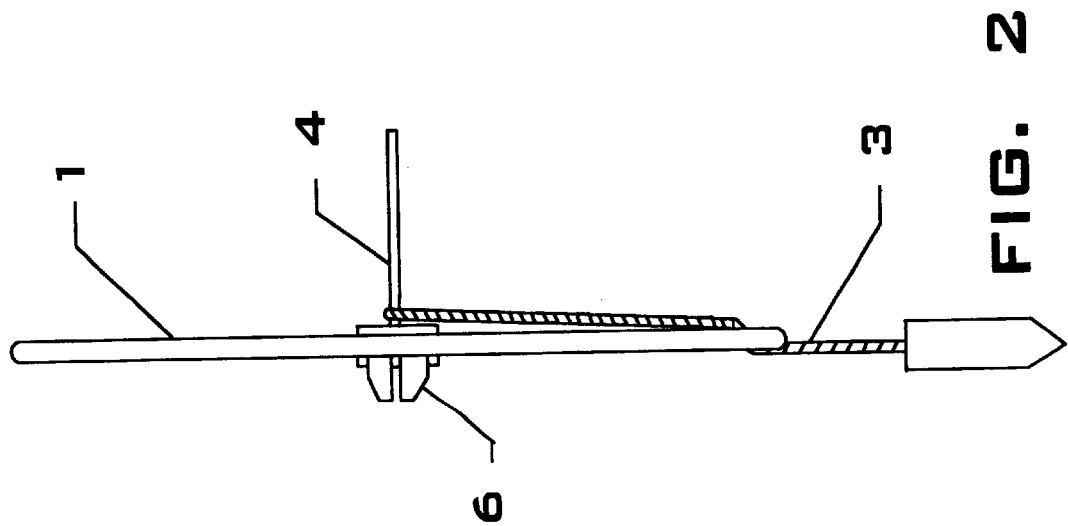
FIG. 2 depicts a side view of the device as it would appear in use with a plumb-line to sight a level line.

Referring to the drawing Figures. In FIG. 1 the current invention is shown as it would appear in use. The user has determined that a level line is to be sighted and so has placed a plumb-line (3) through one of a multiplicity of holes located on the periphery of the disc (2). A rigid rod (4) has been inserted through the hole (5) in the center of the disc to support the end of the plumb-line (3) at its origin. The rigid rod (4) also serves as a handle for the user to hold the disc (1), and as an axis to allow the disc to rotate freely. FIG. 2 offers a side view to illustrate more clearly how the parts connect.

Figure 3:
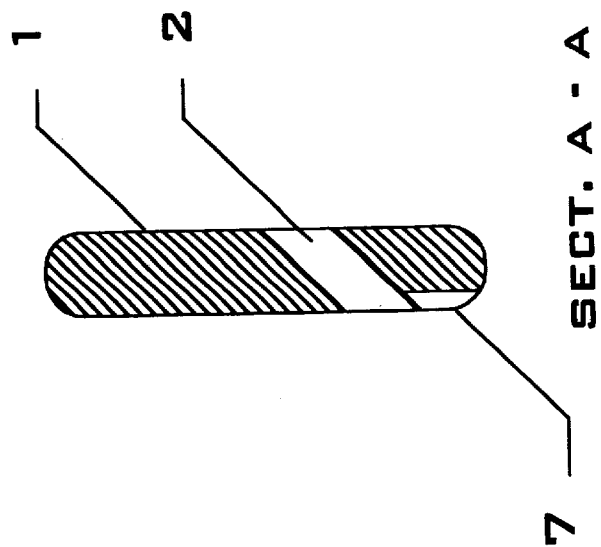
FIG. 3 depicts the section drawing A—A.

In the case of sighting a level line as shown, the plumb-line (3) is placed through a predetermined hole which is located 90 degrees to the visual sights (6). The weight of the plumb bob pulls the plumb-line (3) in an exactly vertical direction, while a slot (7) at the base of the hole (2) keeps the plumb-line on the desired degree mark. FIG. 3 illustrates a section view of the disc showing the relative angle of the hole(s) (2) through the disc (1) and relative depth of the slot(s) (7) which engage the plumb-line.

The taut plumb-line (3) then acts as a lever to keep the disc (1) from rotating. The disc (1) now in a vertical position, and unable to rotate on its axis (4) due to the force of the plumb-line (3) automatically causes the visual sights (6) to seek the predetermined angle desired by the user. In the case depicted, this would be a level line.

Referring now to FIG. 4, and the right triangle rule. If the user were to desire to sight a forty-five degree angle to determine the height of an object, the following procedure would be used: First the user would place the plumb-line(3) through one of the holes on the periphery of the disc (2) located at forty-five degrees to the visual sights (6). A rigid rod (4) would then be inserted through a hole at or near the center of the disc (5) and the end of the plumb-line (3) attached to the rigid rod (4) (shown in FIG. 2) to support the plumb-line (3).

As the user picks the device up and holds it freely in his/her hand, the force of gravity will bring the plumb-line (3) into a vertical position, causing the visual sights (6) to automatically be aligned to an angle of forty-five degrees to vertical as the disc (1) rotates on the axis of the rigid rod (4) and seeks equilibrium.

Thus the current invention will allow the user to sight predetermined angles in a vertical plane by providing a device which uses gravity to align a pair of visual sights to the desired angle to be sighted.

While the invention has been described in conjunction with specific embodiments thereof, it is evident that many alternatives, modifications, and variations will be apparent to those skilled in the art in light of the forgoing description. Accordingly, it is intended to embrace all such alternatives, modifications and variations as fall within the spirit and scope of the appended claims.

What is claimed is:

1. A device for sighting predetermined angles in a vertical plane comprising:

a. a relatively flat plate having a point of equilibrium;

b. a rod supporting said plate at the point of equilibrium, said plate rotating freely about an axis through said rod and said point of equilibrium;

c. a plumb line having an origin attached to said rod;

d. a sight means establishing a sight line along said flat plate; and e. means for releasable attachment of said plumb-line to said plate in a multiplicity of predetermined positions on the periphery of said plate, each of said predetermined positions being at a predetermined angle with respect to said sight line;

f. wherein when said plumb-line is attached to one of said predetermined positions and said plumb-line is plumb, said sight line takes said predetermined angle.

2. A device as described in claim 1 wherein said flat plate is circular and contains indicia around the circumference to indicate degrees of measurement.

3. A device as described in claim 1 wherein said releasable attachment means for attaching said plumb-line to said plate comprises a multiplicity of holes located at said predetermined positions.

4. A device as described in claim 3 wherein said holes each have a slot of predetermined depth and width formed into said plate and leading to said holes from the outer edge of said plate.

* * * * *